(12) United States Patent  
Boll

(10) Patent No.: US 6,488,108 B1
(45) Date of Patent: Dec. 3, 2002

(54) DRIVE UNIT FOR A MOTOR VEHICLE

(75) Inventor: Wolf Boll, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 22 days.

(21) Appl. No.: 09/705,918

(22) Filed: Nov. 6, 2000

(30) Foreign Application Priority Data

Nov. 6, 1999 (DE) ......................................... 199 53 495

(51) Int. Cl.⁷ ................................................. B60K 6/00
(52) U.S. Cl. ........................ 180/65.2; 180/65.1; 180/55; 180/62
(58) Field of Search .............................. 180/65.2, 65.1, 180/65.3, 65.4, 65.5, 65.6, 55, 62; 310/51, 89

(56) References Cited

U.S. PATENT DOCUMENTS

| 5,586,613 | A | * | 12/1996 | Ehsani | ...................... | 180/65.2 |
| 5,915,489 | A | * | 6/1999 | Yamaguchi | ................ | 180/65.2 |
| 6,155,364 | A | * | 12/2000 | Nagano et al. | ............ | 180/65.2 |
| 6,155,365 | A | * | 12/2000 | Boberg | ....................... | 180/65.2 |
| 6,208,036 | B1 | * | 3/2001 | Evans et al. | .................. | 290/46 |
| 6,209,672 | B1 | * | 4/2001 | Severinsky | ................. | 180/65.2 |
| 6,220,380 | B1 | * | 4/2001 | Mita et al. | ................... | 180/65.1 |
| 6,251,037 | B1 | * | 6/2001 | Baumgaertner et al. | ........ | 475/2 |
| 6,328,670 | B1 | * | 12/2001 | Minowa et al. | ................ | 477/5 |
| 2001/0037905 | A1 | * | 11/2001 | Nogi et al. | ................. | 180/65.2 |
| 2001/0042647 | A1 | * | 11/2001 | Sakamoto et al. | ......... | 180/65.2 |
| 2001/0042648 | A1 | * | 11/2001 | Wakashiro et al. | ........ | 180/65.2 |
| 2001/0050190 | A1 | * | 12/2001 | Takenaka | .................... | 180/65.2 |

FOREIGN PATENT DOCUMENTS

| DE | 2732974 | 2/1979 |
| DE | 3730653 | 3/1988 |
| DE | 19539571 | 4/1997 |

* cited by examiner

Primary Examiner—Brian L. Johnson
Assistant Examiner—J. Allen Shriver
(74) Attorney, Agent, or Firm—Crowell & Moring LLP

(57) ABSTRACT

A drive unit for a motor vehicle exhibits an internal combustion engine and a transmission. The drivable wheels of the motor vehicle can be driven by means of the rotary motion of the output shaft of the transmission. The drivable wheels of the motor vehicle can be driven alternatively or additionally by an electric motor, which can be mounted in such a manner that its rotor forms a part of the output shaft of the transmission. The electric motor is dimensioned in such a manner in its outer dimensions that it can replace a part of the output shaft of the transmission.

19 Claims, 2 Drawing Sheets

DRIVE UNIT FOR A MOTOR VEHICLE

BACKGROUND AND SUMMARY OF THE INVENTION

This application claims the priority of German Patent Document 199 53 495.0, filed November 6, 1999, the disclosure of which is expressly incorporated by reference herein.

The invention relates to a drive unit for a motor vehicle with an internal combustion engine, a transmission having an output shaft for driving vehicle wheels and an electric drive motor which is selectively engaged to drive the vehicle wheels.

German Patent Document DE 27 32 974 A1 already discloses a drive unit, where a utility vehicle, which is explained with reference to a bus as an example, is equipped with an electric motor, with which the vehicle is driven in normal driving mode. Furthermore, this vehicle is equipped with an internal combustion engine, with which the vehicle can be driven alternatively or additionally to the electric motor. If no supply of electric energy is guaranteed, because, for example, the accumulators in the vehicle are empty or because no overhead line is provided over one segment of the driving distance, the vehicle can be driven then solely with an internal combustion engine. If the vehicle is supposed to be moved up an incline, the vehicle can be driven by both the electric motor and the internal combustion engine, in order to increase the available power. It is stated that the internal combustion engine is dimensioned in such a manner in proportion to the electric motor that the maximum power output of the internal combustion engine is approximately ⅓ to ⅕ of the maximum power output of the electric motor. Owing to this ratio the vehicle is driven with the electric motor in normal driving mode. In the construction of the drive unit, the electric motor forms a part of the cardan shaft of the drive unit and thus also a part of the output shaft of the transmission. Between the internal combustion engine and the transmission, on the one hand, as well as that part of the power train that comprises the electric motor up to the drivable wheels of the vehicle there is a coupling device, with which the internal combustion engine and the transmission can be separated from the rest of the power train.

Starting from this state of the art, the present invention is concerned with the problem of expanding applications of an electric drive for vehicles.

The invention solves this problem by providing a drive unit, according to which the electric engine is dimensioned in such a manner in its outer dimensions that in a motor vehicle, which is designed primarily to be driven by an internal combustion engine, said electric engine can replace a part of the transmission output shaft.

Thus, it is possible in an advantageous manner to provide the hybrid drive as a special accessory for a motor vehicle without the need for extensive design differences in the installation of a hybrid drive as compared to the installation of a single drive by means of the internal combustion engine and without all of the additional drawbacks, such as increased production costs and the more extensive logistics. Thus, a motor vehicle with a purely conventional drive can be equipped in a simple manner or—as additional accessory—with a hybrid drive.

Owing to the given length of the output shaft of the transmission, such a drive unit turns out to be especially advantageous in a vehicle whose rear wheels can be driven and where the internal combustion engine is housed in the front.

When the electric motor is dimensioned correspondingly, the underfloor of the motor vehicle does not have to be modified, if the dimensions of the electric motor are not at least significantly greater than those of that segment of the output shaft of the transmission that the electric motor replaces.

In the design of the drive unit of certain preferred embodiments of the invention, the electric motor is mounted on its own shaft. Thus, the flexibility of the design of the drive unit is further increased so that the design of the drive unit with a hybrid drive as special accessory can be implemented comparatively inexpensively in that the electric motor is self-bearing. There is no additional design cost to provide bearing holding points for the electric motor when it is supposed to be installed.

In the design according to certain preferred embodiments of the invention, the electric engine is mounted at least somewhat springy at the transmission case. Thus, the electric motor can be supported so as to be carried. At the same time the springy mounting can absorb the oscillations of the power train in that the cardan shaft intermediate bearing is relieved.

In the design of the drive unit, according to certain preferred embodiments of the invention, the torque bracing element of the electric engine is a component of a mechanical connection of the housing of the electric engine with the transmission case. With this type of torque bracing it proves to be advantageous that the oscillations of the power train are transferred only in a damped state to the chassis by the bearing buffers of the internal combustion engine or the transmission. The driving comfort for the passengers is increased, as compared to a mechanical connection of the electric motor to the chassis in order to brace the torque.

In the design of the drive unit, according to certain preferred embodiments of the invention, the points of action of the mechanical connection at the transmission case lie in a horizontal plane. Furthermore, a knuckle joint is provided between the transmission and the electric engine.

In the design of the drive unit, according to certain preferred embodiments of the invention, the points of action of the mechanical connection at the housing of the electric engine lie in a horizontal plane, whereby a knuckle joint is provided between the transmission and the electric engine.

In the design of the drive unit, according to certain preferred embodiments of the invention, the points of action of the mechanical connection at the housing of the electric engine lie in a horizontal plane, where between the transmission and the is electric engine there is a knuckle joint, on both sides of which on a level with its peak a torque bracket is mounted so as to bend.

In the design of the drive unit, according to certain preferred embodiments of the invention, the dead weight of the electric engine is absorbed at least partially by a spring with low damping between the vehicle floor and the housing of the electric engine. Thus, when the power train stutters or splutters, these motions can be absorbed in an advantageous manner.

Other objects, advantages and novel features of the present invention will become apparent from the following detailed description of the invention when considered in conjunction with the accompanying drawings.

DETAILED DESCRIPTION OF THE DRAWINGS

Figure 1:
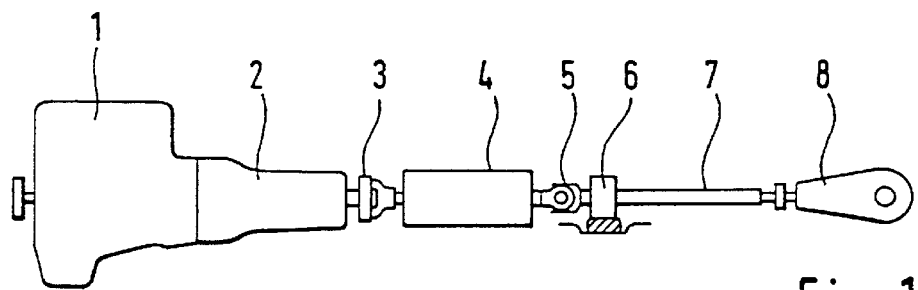
FIG. 1 is a schematic total overview of a power train constructed according to a preferred embodiment of the present invention.

FIG. 1 is a total overview of the power train. Reference numeral 1 refers to the internal combustion engine; and reference numeral 2 to a transmission, which can be, for example, an automatic transmission. The internal combustion engine and automatic transmission are designed in such a manner that the vehicle is driven by them in normal driving mode.

The automatic transmission can be controlled advantageously by means of CAN (=car area network). The internal combustion engine can also be controlled by CAN and e-gas (electronic gas pedal). In this case the drive management of the electric engine 4 can be represented by a simple chip change of the drive controller (including ABS (=antilock braking system), ASR (=acceleration slip regulation), ESP (=electronic stability program), EHB (=electrohydraulic brake)). The control commands of the drive controller are sent over CAN to the power electronics of the electric motor or engine.

The driving comfort of the automatic transmission can be further increased in an advantageous manner with the electric motor, because change-over jerks (especially in the lower gears) can be reduced by assisting moments of the electric motor.

Furthermore, there is a joint flange 3, by means of which an electric engine 4 can be connected to the output shaft of the transmission 2, and thus forms a part of this output shaft. The electric engine 4 is designed in such a manner with respect to its outer dimensions that it can replace a part of the output shaft of the transmission 2 without having to make any other structural changes in the vehicle.

In the illustrated embodiment, the output shaft of the transmission 2 is the cardan shaft of the vehicle. The output shaft of the transmission 2 is thus defined as a shaft that is connected force-lockingly to the transmission output. To this end, this output shaft does not have to be necessarily integrated into the design of the transmission 2. The drive forces can also be transferred, for example, by means of a joint or another bypass to the corresponding shaft, which constitutes, however, the output shaft of the transmission 2 in accordance with this application.

The electric motor 4 can be mounted on its own shaft so that its weight is absorbed by the transmission 2 and the cardan intermediate bearing.

The cardan intermediate bearing 6 can also be relieved in such a manner that the dead weight of the electric motor 4 is absorbed at least partially by a spring 14 with a low damping between the vehicle floor and the electric engine housing.

The output of the electric motor 4 is connected by means of a universal joint 5 to an intermediate bearing 6 of the cardan shaft of the vehicle.

The reference numeral 7 denotes the remaining part of the cardan shaft; and reference numeral 8, the rear axle gear.

The electric motor 4 is mounted on its own shaft. A detailed view of the joint flange 3 is depicted in FIGS. 2 and 3.

Figure 2:
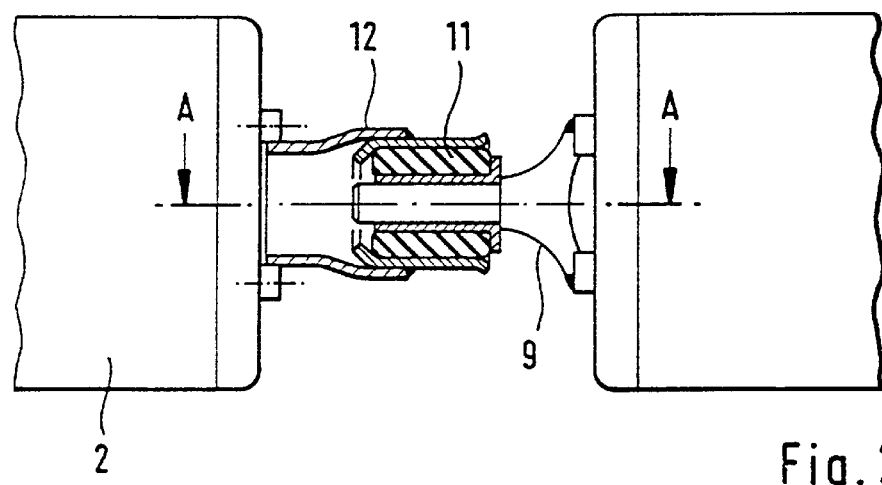
FIG. 2 is an enlarged part sectional side view showing the connection of the electric motor with the transmission of the power train shown in FIG. 1.

FIG. 2 depicts the joint flange 3 in a side view (cut along A—A of FIG. 3), which corresponds to the viewing direction in FIG. 1. The reference numeral 9 denotes a torque bracket, with which the stator of the electric motor 4 is held. This torque bracket 9 is mounted by an elastomer 11 by means of a holding device 12 of the elastomer jacket. Thus, the torque bracket can move so as to bend.

Figure 3:
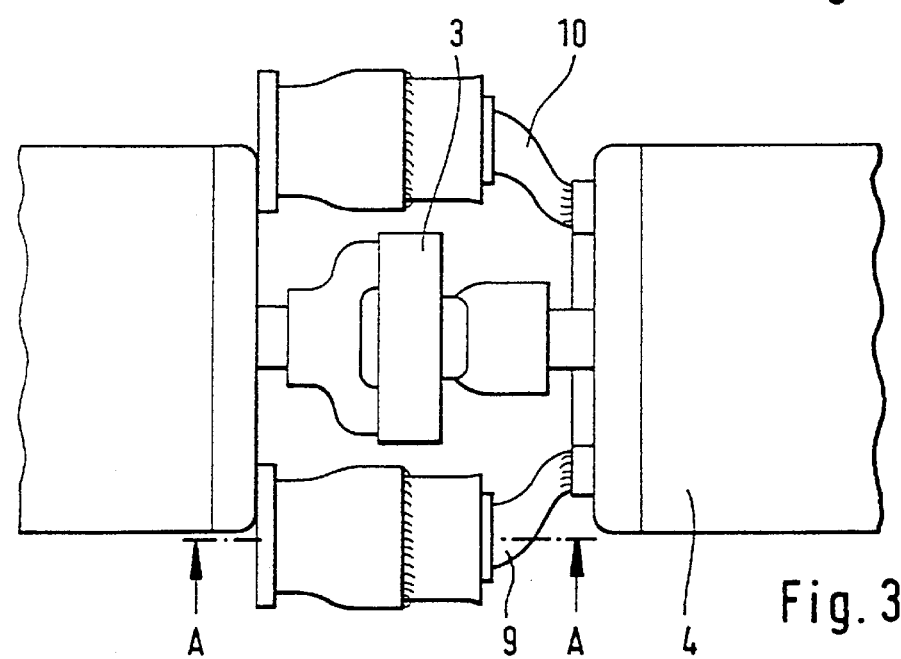
FIG. 3 is an enlarged top view showing the connection of the electric motor with the transmission of the power train shown in FIG. 1.

FIG. 3 is a top view of the power train depicted in FIG. 2. In FIG. 2 it is obvious that the torque brackets 9 and 10 are present on both sides.

Since the torque brackets 9 and 10 are mounted by means of an elastomer 11 and, furthermore, the universal joint 3 is moveable, at this place any jolts that might occur in a load change can be absorbed in the power train, thus improving the driving comfort. Thus, the torque brackets 9, 10 are mounted so as to bend on a level with the universal joint 3, provided in the shaft connection. Since, moreover, the torque bracing of the electric motor 4 occurs at the housing of the transmission 2, which in turn is connected by means of bearing buffers to the chassis, noises that are generated while operating the electric motor 4 are transferred only in a proportionally reduced state. This, too, increases the driving comfort.

Figure 4:
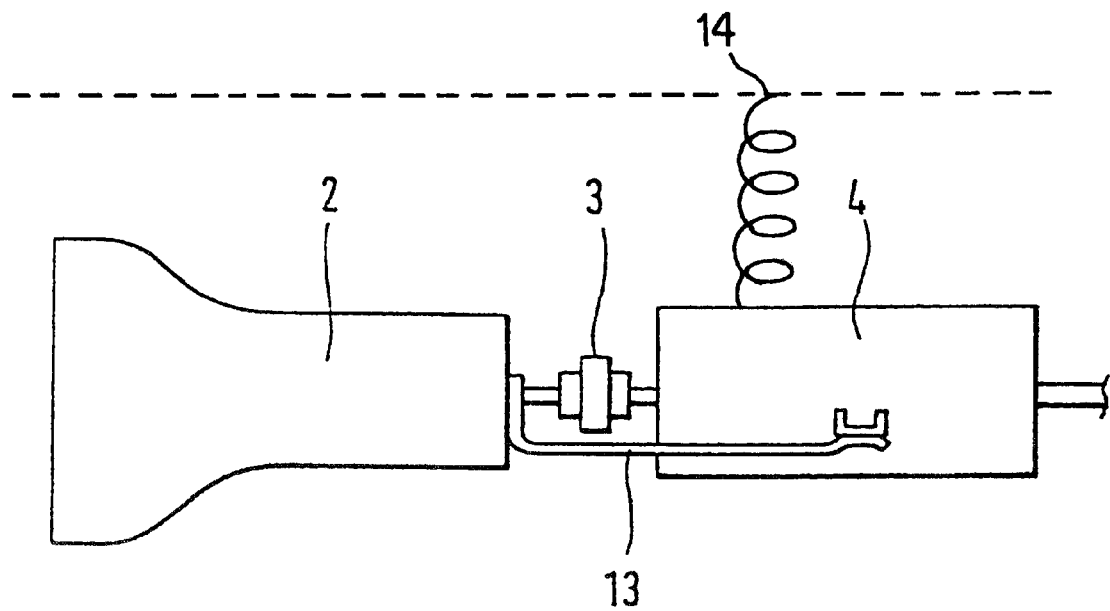
FIG. 4 is a side schematic view of a power train similar to FIG. 1, with an at least partial bracing of the electric motor.

FIG. 4 is a drawing of the transmission 2 with the electric motor 4, where the electric motor 4 is braced by a U-clamp 13 so as to be carried elastically at the housing of the transmission 2. Thus, the electric motor 4 is fastened here so that it is at least partially supported at the housing of the transmission 2.

The electric motor 4 can be operated as a drive unit or as a generator. Depending on the principle of the electric motor 4 that is used (fast or slow running, with or without idle drag moment), the motor can be uncoupled from its housing of the continuous shaft and/or designed so as to be driven by a transmission. To this end, the shaft of the electric motor must be designed as a hollow shaft.

The coupling can be carried out as a simple jaw clutch, when the electric engine can be synchronized actively (electrically) or passively (mechanically) prior to coupling together.

Preferably a high overloadable asynchronous motor without clutch and without transmission can be used, because it does not exhibit any drag losses, is very inexpensive and can also be used for both useful braking and booster functions owing to the brief overloadability.

The installed power should be preferably in the range of approx. 10 kw per ton vehicle weight. It has been demonstrated that approximately 18% fuel can be saved hereby. In contrast to the 22% saving that was found with an optimized electrical motor, is it has turned out to be advantageous in the present invention that the comparatively slightly worse result can be achieved with significantly simpler installation costs.

At the specified output data the traction battery can occupy, for example, the space of the spare wheel. The power electronics can be housed, for example, behind the rear seats or in the rear axle area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. Drive unit for a motor vehicle, which exhibits an internal combustion engine and a transmission, wherein drivable wheels of the motor vehicle can be driven by way of rotary motion of an output shaft of the transmission, wherein the drivable wheels of the motor vehicle can be driven alternatively or additionally by way of an electric motor which can be mounted in such a manner that a rotor forms a part of the output shaft of the transmission, wherein the electric motor is dimensioned in such a manner in outer dimensions that in a motor vehicle, which is designed primarily to be driven by an internal combustion engine, said electric motor can replace a part of the output shaft of the transmission, and wherein the electric motor is mounted at least partially with an elastic element at a housing of the transmission.

2. Drive unit as claimed in claim 1, wherein the electric motor is mounted on a second shaft.

3. Drive unit according to claim 2, wherein between a housing of the electric motor and the housing of the transmission a mechanical connection is provided, and a torque bracing element of the electric motor is a component of the mechanical connection.

4. Drive unit according to claim 1, wherein between a housing of the electric motor and the housing of the transmission a mechanical connection is provided, and a torque bracing element of the electric motor is a component of the mechanical connection.

5. Drive unit as claimed in claim 3, wherein points of action of the mechanical connection at the housing of the transmission lie in a horizontal plane, and wherein a knuckle joint is provided between the transmission and the electric motor.

6. Drive unit as claimed in claim 4, wherein points of action of the mechanical connection at the housing of the transmission lie in a horizontal plane, and wherein a knuckle joint is provided between the transmission and the electric motor.

7. Drive unit as claimed in claim 3, wherein points of action of the mechanical connection at the housing of the electric motor lie in a horizontal plane, and wherein a knuckle joint is provided between the transmission and the electric motor.

8. Drive unit as claimed in claim 4, wherein points of action of the mechanical connection at the housing of the electric motor lie in a horizontal plane, and wherein a knuckle joint is provided between the transmission and the electric motor.

9. Drive unit as claimed in claim 5, wherein points of action of the mechanical connection at the housing of the electric motor lie in a horizontal plane, and wherein the knuckle joint is provided between the transmission and the electric motor.

10. Drive unit as claimed in claim 6, wherein points of action of the mechanical connection at the housing of the electric motor lie in a horizontal plane, and wherein the knuckle joint is provided between the transmission and the electric motor.

11. Drive unit for a motor vehicle, which exhibits an internal combustion engine and a transmission, wherein drivable wheels of the motor vehicle can be driven by way of rotary motion of an output shaft of the transmission, wherein the drivable wheels of the motor vehicle can be driven alternatively or additionally by way of an electric motor which can be mounted in such a manner that a rotor forms a part of the output shaft of the transmission, wherein the electric motor is dimensioned in such a manner in outer dimensions that in a motor vehicle, which is designed primarily to be driven by an internal combustion engine, said electric motor can replace a part of the output shaft of the transmission, wherein, in a shaft connection between the transmission and the motor, a knuckle joint is provided, and wherein, on each side on a level with the knuckle joint, a torque bracket is mounted so as to bend.

12. Drive unit as claimed in claim 3, wherein, in a shaft connection between the transmission and the motor, a knuckle joint is provided, and wherein, on each side on a level with the knuckle joint, a torque bracket is mounted so as to bend.

13. Drive unit as claimed in claim 4, wherein, in a shaft connection between the transmission and the motor, a knuckle joint is provided, and wherein, on each side on a level with the knuckle joint, a torque bracket is mounted so as to bend.

14. Drive unit as claimed in claim 2, wherein dead weight of the electric motor is absorbed at least partially by a spring with low damping between a vehicle floor and a housing of the electric motor.

15. Drive unit as claimed in claim 1, wherein dead weight of the electric motor is absorbed at least partially by a spring with low damping between a vehicle floor and a housing of the electric motor.

16. Drive unit as claimed in claim 3, wherein dead weight of the electric motor is absorbed at least partially by a spring with low damping between a vehicle floor and the housing of the electric motor.

17. Drive unit as claimed in claim 4, wherein dead weight of the electric motor is absorbed at least partially by a spring with low damping between a vehicle floor and the housing of the electric motor.

18. Drive unit as claimed in claim 6, wherein dead weight of the electric motor is absorbed at least partially by a spring with low damping between a vehicle floor and the housing of the electric motor.

19. Drive unit as claimed in claim 11, wherein dead weight of the electric motor is absorbed at least partially by a spring with low damping between a vehicle floor and the housing of the electric motor.

* * * * *